United States Patent [19]

Fukushima et al.

[11] Patent Number: 4,727,444
[45] Date of Patent: Feb. 23, 1988

[54] LOADING DEVICE FOR A CARTRIDGE

[75] Inventors: Yasuhisa Fukushima, Hirakata; Yoshinobu Nakata, Ikoma; Masuo Maruyama, Moriguchi; Benichi Miyazaki, Hirakata, all of Japan

[73] Assignee: Matsushita Electric Industrial Co., Ltd., Osaka, Japan

[21] Appl. No.: 865,820

[22] Filed: May 22, 1986

[30] Foreign Application Priority Data

May 27, 1985 [JP] Japan .................. 60-113622
May 27, 1985 [JP] Japan .................. 60-113623
May 27, 1985 [JP] Japan .................. 60-113624

[51] Int. Cl.4 .................. G11B 5/012; G11B 5/016
[52] U.S. Cl. .................. 360/97; 360/99
[58] Field of Search .................. 360/97, 99, 86, 96.5, 360/133

[56] References Cited

U.S. PATENT DOCUMENTS 4,562,498 12/1985 Shibata .................. 360/99
4,573,093 2/1986 Obama et al. .................. 360/97
4,604,666 8/1986 Kitahara et al. .................. 360/99

FOREIGN PATENT DOCUMENTS 2132807 7/1984 United Kingdom .................. 360/97

Primary Examiner—Stuart N. Hecker
Assistant Examiner—David J. Severin
Attorney, Agent, or Firm—Stevens, Davis, Miller & Mosher

[57] ABSTRACT

A cartridge loading device comprising a cartridge holder for receiving therein a cartridge; a base provided with guide grooves through which pins formed on side walls of the cartridge holder are received for guiding the cartridge holder; a loading plate supported movably to the base for causing the cartridge holder to reciprocatingly move along the guide grooves of the base between a first position where the cartridge is loaded/unloaded and a second position where a disc received in the cartridge is rotated; an eject plate supported movably to the base for unloading the cartridge received in the cartridge holder at the first position and for allowing, when the cartridge is loaded, the cartridge holder to the second position; a sub-eject plate supported movably to the base coming into contact with the loading plate; at least one first resilient member connected at one end to the loading plate and at the other end to the sub-eject plate for resiliently engaging the loading plate and the sub-eject plate with each other; at least one second elastic member for biasing the loading plate in one direction; at least one third resilient member for biasing the eject plate in a direction for discharging the cartridge; a first lock lever engaging with a lock claw formed in the loading plate to thereby lock the loading plate and restrict a movement of the loading plate; a second lock lever for locking the sub-eject lever and restricting a movement of the sub-eject lever; and a solenoid for driving the first lock lever.

11 Claims, 8 Drawing Figures

LOADING DEVICE FOR A CARTRIDGE

BACKGROUND OF THE INVENTION

The present invention relates to a device for loading a cartridge incorporating a rotatable circular disc such as a floppy disc or an optical disc used in a recording-/reproducing apparatus for recording/reproducing information on the disc or erasing the recorded information.

A conventional cartridge loading device of this type is typically constructed as shown in FIGS. 5 and 6. This structure is shown in, for example, Japanese patent unexamined publication No. 108056/1983.

When a cassette 50 is inserted into a cassette receiving body 51 as indicated by arrow V in FIG. 5, the cassette 50 is first brought into contact with a rear wall of the cassette receiving body 51. Subsequently, when the cassette 50 is further inserted, overcoming a component of spring force of tension springs 54 the insertion direction as indicated by arrow X, the cassette receiving body 51 is moved in the cassette insertion direction along guide slots 53a of guide plates 53. Then, the cassette receiving body 51 is moved downwardly by the other component Y of the force of the tension springs 54 directed toward a spindle 57 as indicatd by arrow Y. Thus, the loading operation of the cassette 50 has been completed as shown in FIG. 6a. On the other hand, when the cassette 50 is unloaded, a slide plate 55 is pushed in a direction indicated by arrow W, so that inclined portions 55a of the slide plate 55 come into contact with pins 52 of the cassette receiving body 51 and the guide plates 53 cause the cassette receiving body 51 to move upwardly. As a result, the cassette receiving body 51 is returned back to its original position by the force component X in the cassette insertion direction of the tension springs 54. Thus, the unloading operation of the cassette 50 has been completed as shown in FIG. 6b.

However, in the above-described arrangement, since the guide slots 53a of the guide plates 53 are so constructed that the pins 52 are movable upwardly during loading of the cassette 50 as is apparent from FIG. 6a, the cassette receiving body 51 might be moved upwardly by external factors such as vibrations. In this case, if the disc rotating within the cassette 50 is brought into contact with inner walls of the cassette 50, then the disc is damaged. In order to eliminate the adverse affect of the external factors such as vibrations, it is sufficient to increase the component Y of force of the tension springs 54. However, in this case, an impact force generated upon setting the cassette 50 at a predetermined position is increased corresponding to the increment of the component Y, resulting in generation of large impact noises. In addition, when the disc is continuously used, the cassette 50 would be caused to be damaged.

Also, when the cassette 50 is unloaded, the slide plate 55 is directly pushed irrespective of the rotary state of the disc so that the cassette receiving body 51 is lifted and unloaded by the movement of the slide plate 55. Therefore, when the unloading operation is carried out during the rotation of the disc, the disc is brought into the inner walls of the cassette 50, resulting in the damage of the disc. Also, the inner walls of the cassette 50 are abraded creating abrasion powder which adheres to the disc. The prior art device suffers from such problems. Also, it should be noted that the pins 52 provided on the cassette receiving body 51 are movable upwardly along the guide slots 53a of the guide plates 53 as is apparent from FIG. 6a. Therefore, if the slide plate 55 is strongly pushed overcoming the force components X and Y of the tension springs 54, then the cassette receiving body 51 is abruptly pushed thereby, so that the pins 52 would bounce away from the guide slots 53a by the reaction force thereof. Thus, the prior art device suffers from the fact that the cassette 50 is difficult to unload.

SUMMARY OF THE INVENTION

Accordingly, an object of the invention is to provide a cartridge loading device which holds the cartridge at a predetermined position while preventing a disc from coming into contact with inner walls of the cartridge, in the cartridge loaded state, even if external factors such as vibrations are applied to the cartridge or even if the cartridge unloading operation is carried out during the rotation of the disc.

Another object of the invention is to provide a cartridge loading device which prevents a disc from being damaged during the operation of the cartridge loading, and which is very easy to assemble.

According to the invention, there is provided a cartridge loading device comprising a cartridge holder for receiving therein a cartridge; a substrate provided with guide grooves through which pins formed on side walls of the cartridge holder adapted to be is inserted and guided; a loading plate supported movably to the substrate for causing the cartridge holder to reciprocatingly move along the guide grooves of the substrate between a first position where the cartridge is loaded-/unloaded and a second position, where a disc received in the cartridge is adapted to be drivingly rotated; an eject plate supported movably to the substrate, for unloading the cartridge received in the cartridge holder, for holding the cartridge holder at the first position and for allowing, when the cartridge is loaded, the cartridge holder to move toward the second position; a sub-eject plate supported movably to the substrate for coming into contact with the loading plate; at least one first elastic member connected at one end to the loading plate and at the other end to the sub-eject plate for elastically engaging the loading plate and the sub-eject plate with each other; at least one second elastic member for biasing the loading plate in one direction; at least one third elastic member for biasing the eject plate in a direction for discharging the cartridge; a first lock lever engaging with a lock claw formed in the loading plate to thereby lock the loading plate and restrict a movement of the loading plate; a second lock lever for locking the sub-eject lever and restricting a movement of the sub-eject lever; and a drive means for driving the first lock lever.

DETAILED DESCRIPTION OF THE PREFERRED EMBODIMENTS

One embodiment of the present invention will now be described with reference to the accompanying drawings.

Figure 1:
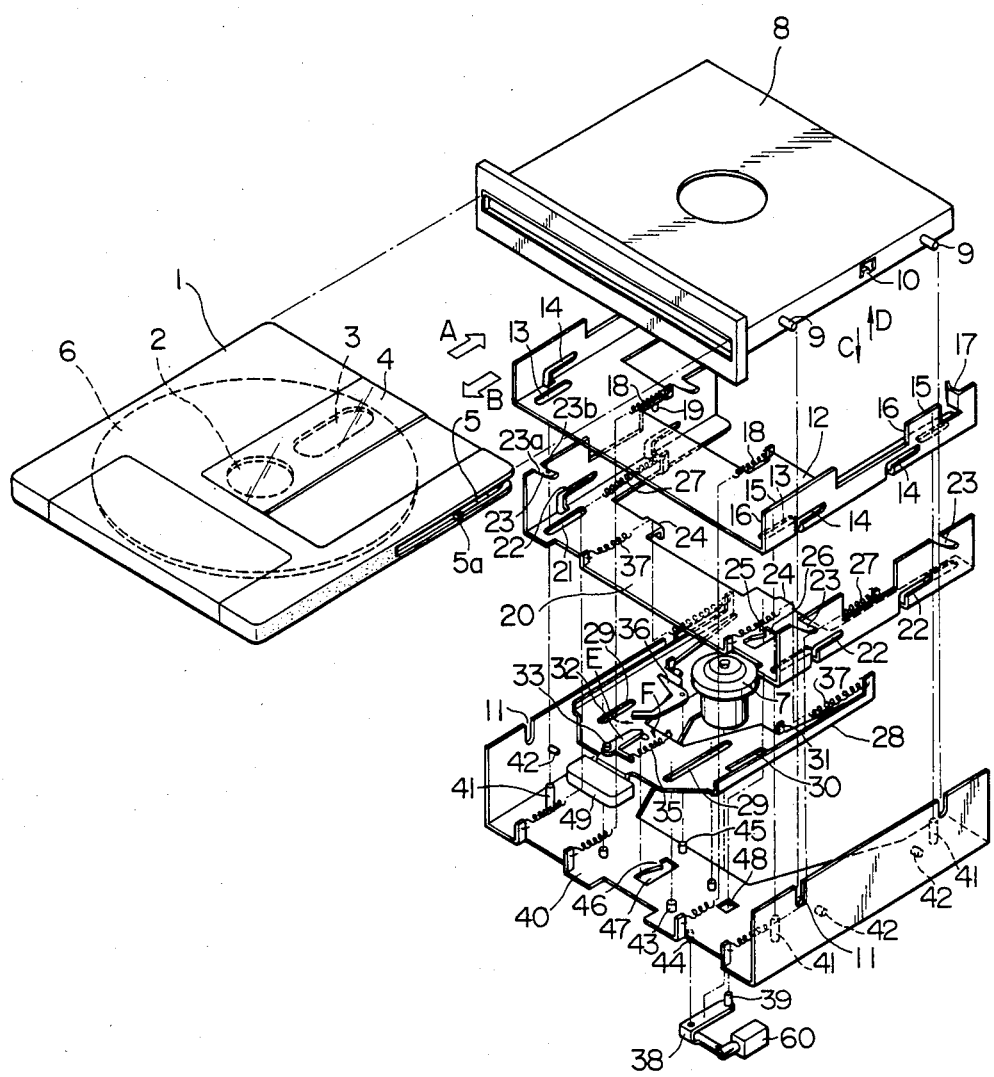
FIG. 1 is an exploded perspective view of a cartridge loading device in accordance with one embodiment of the invention.

In FIG. 1, a cartridge 1 rotatably receives therein a disc 6 for recording information such as audio/video signals or literal signals. The cartridge 1 has a center hole 2 for receiving a rotary drive member 7 which rotates the disc 6. The cartridge also has a radial head insertion hole 3 for receiving a head for recording desired information in the disc and playing or erasing recorded information. A shutter 4 for opening/closing the center hole 2 and the head insertion hole 3 normally closes the center hole 2 and the head insertion hole 3, as shown in FIG. 1, thus preventing foreign matter from entering the interior of the cartridge 1. The shutter 4 is driven by a slider 5.

A cartridge holder 8 for receiving the above-described cartridge 1 and to move the cartridge 1 between a first position where the insertion and discharge of the cartridge 1 can be performed and a second position where the disc 6 is drivingly rotated by the above-described rotary drive member 7, in engagement with a loading plate to be described later. The cartridge holder 8 is provided on each side wall with a pair of pins 9 and a projection 10 which is in engagement with the above-descirbed slider 5.

A substantially U-shaped eject plate 12 is engaged with the above-describe pins 9, thereby holding the cartridge 1 at the first position and restricting the movement of the cartridge 1 toward the second position. Also, the eject plate 12 serves to discharge the cartridge 1 to the outside of the cartridge holder 8. The eject plate 12 is supported slidably in the cartridge insertion direction on a substrate or base 40 having at both ends side walls, and is formed therein with slots 13, 14 engaged with guide shafts 41, 42 implanted in the base 40, respectively. Third resilient members 18 such as tension springs cause the eject plate 12 to be normally urged in the cartridge discharge direction. The above-described guide shafts 41 serve to move and guide, in the cartridge insertion direction, the eject plate 12 and a loading plate 20 which will be described later, respectively. Similarly, the guide shafts 42 serve to restrict, in the vertical direction, the eject plate 12 and the loading plate 20. Each of the above-described slots 14 is formed contiguously from the side wall to the bottom wall as shown in FIG. 1, and the bottom wall side portion of each slot 14 is insertable with an associated guide shaft 42. Therefore, the mounting operation of the eject plate 12 onto the base 40 may readily be carried out simply by inserting the eject plate 12 downwardly. Before the cartridge 1 is loaded into the cartridge holder 8, the latter is supported at the above-described first position with the above-described pins 9 in sliding contact with each sliding surface 15 of the eject plate 12, and when the cartridge 1 is inserted into the cartridge holder 8, the cartridge 1 is brought into contact with walls 17 so that the eject plate 12 is slidingly moved in a direction indicated by the arrow A, by the cartridge 1. Therefore, the pins 9 are released from the sliding contact state on the above-described sliding surfaces 15 and are movable in a direction indicated by the arrow C. Thus, the restriction in the movement toward the above-described second position is relieved. Although, in the preferred embodiment, a plurality of sliding surfaces 15 are formed corresponding to the pins 9, one sliding surface is sufficient. Also, the pins 9 of the cartridge holder 8 are inserted into associated guide grooves 11 formed in both side plates of the base 40, so that the cartridge holder 8 is restricted in the cartridge insertion direction but is movable and guided in the directions C and D. Top portions of the guide grooves 11 are opened so that the pins 9 of the cartridge holder 8 may be inserted into the grooves 11 from above.

The substantially U-shaped loading plate 20 serves to drive the cartridge holder 8 to move from the first position to the second position and vice versa. The loading plate 20 is movably supported in the cartridge insertion direction with its slots 21 being engaged with the aforementioned guide shafts 41 and its slots 22 being engaged with the aforementioned guide shafts 42, respectively. The loading plate 20 is normally urged in the cartridge discharge direction (i.e., the direction indicated by arrow B) by second resilient members 27. In the same manner as the slots 14 of the above-described eject plate 12, the slots 22 are formed in the bottom wall of the loading plate 20 so that the loading plate 20 may be mounted movably on the base 40 simply by inserting the loading plate 20 downwardly. Guide holes 23 inclined downwardly with respect to the cartridge insertion direction are engaged with the pins 9 of the cartridge holder 8 so as to drivingly guide the cartiridge holder 8, each of the guide holes 23 being defined by inclined surfaces 23a and 23b. Top ends of the guide holes 23 are opened so that the pins 9 of the cartridge holder 8 may be inserted into the guide holes 23 from above. A lock claw 25 extending into a hole 26 is engaged with a first lock lever 38 which will be later described, thus locking the loading plate 20 on the base 40 and restricting the movement of the loading plate 20 in the direction A. Walls 24 are bent in a downwardly vertical direction.

A sub-eject plate 28 functions to move the above-described loading plate 20 in the direction of arrow A and is supported movably in the cartridge insertion direction with its slots 29 being engaged with guide shafts 43 formed on the base 40. The sub-eject plate 28 is engaged with the loading plate 20 in a resilient manner by the first resilient members 37 such as tension springs with the walls 24 of the loading plate 20 and projections 31 of the sub-eject plate 28 being held in contact with each other. On the sub-eject plate 28, a second lock lever 32 is pivotally supported about a pivot shaft 33, causing a lock pin 34 fixed to the second lock lever 32 to engage with a lock claw 46 extending into an interior of a hole 47 of the substrate 40, thus locking the sub-eject plate 28 on the base 40 and restricting the movement in the direction of arrow B of the sub-eject plate 28. The second lock lever 32 is biased in a direction E by an elastic member 35 such as a tension spring.

A push button 49 is made of, for example, ABS resin and is formed integrally with the sub-eject plate 28. An L-shaped release lever 36 causes the second lock lever 32 to rotate in a direction indicated by arrow F for releasing the lock of the sub-eject plate 28. The release lever 36 is pivotally supported about a pivot shaft 45 on the substrate 40. The release lever 36 is rotated by a pin 19 formed on an underside of the eject plate 12.

A first lock lever 38 functions to lock the loading plate 20 on the base 40 and is pivotally supported about a pivot shaft 44 formed on the base 40. A lock pin 39 of the first lock lever 38 is engaged with the aforesaid lock claw 25 of the loading plate 20, thus restricting the movement, in the direction A, of the loading plate 20.

A drive means 60 made up of a solenoid or the like causes the lock pin 39 to be engaged with the lock claw 25 and keeps this situation by an electric power. When the cartridge 1 is moved to the second position, the electric power is supplied to the drive means 60, and when the rotary drive member 7 is stopped, the supply of the electric power thereto is stopped. The control of the electric supply to the drive means 60 may be attained by detecting the movement of the cartridge 1 or the cartridge holder 8 by means of a detecting means such as a microswitch (not shown) or also by detecting the movement of the loading plate 20. A hole 48 formed in the substrate 40 and a slot 30 formed in the sub-eject plate 28 enable the lock claw 39 of the lock lever 38 to be inserted into the hole 26 of the loading plate 20.

The loading and unloading operations of the cartridge will now be explained.

Figure 2A:
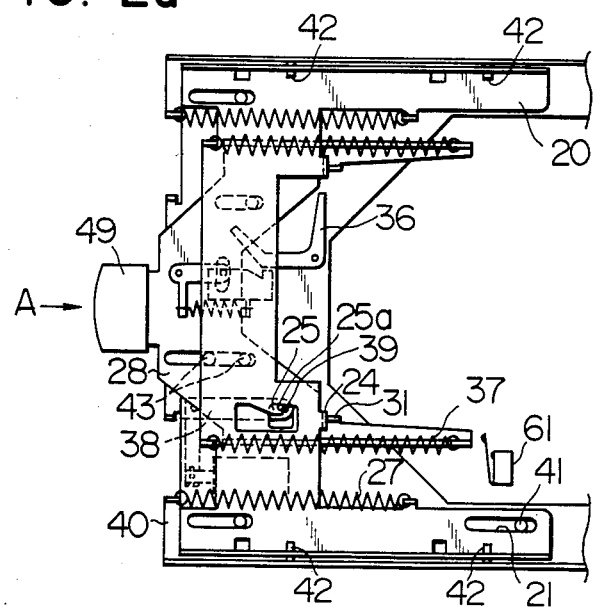
FIGS. 2a and 2b are plan views showing the operated states of the device shown in FIG. 1.
Figure 3:
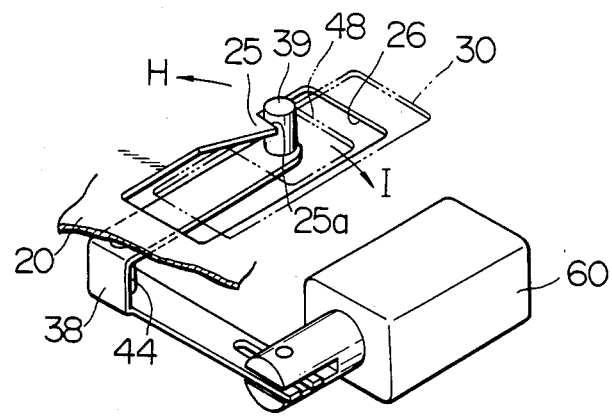
FIG. 3 is a perspective view showing the operated state of the first lock lever of the device shown in FIG. 1.

As shown in FIG. 1, when the cartridge 1 is inserted into the cartridge holder 8 in the direction A, the projection 5a of the slider 5 is brought into contact with the projection 10. When the cartridge 1 is further inserted, since the insertion of the slider 5 is restricted by the projection 10, the shutter 4 starts to move, thus opening the center hole 2 and the head insertion hole 3. Subsequently, the cartridge 1 is brought into contact with the walls 17 of the eject plate 12. When the cartridge 1 is further inserted against the biasing force of the third resilient members 18, the eject plate 12 is moved along the guide shafts 41 in the cartridge insertion direction (direction A), and then, the sliding engagement between the pins 9 of the cartridge holder 8 and the sliding surfaces 15 of the eject plate 12 is released. At this time, the center hole 2 and the head insertion hole 3 are fully opened, and a clamper (not shown) for holding the head and the disc 6 at the rotary drive member 7 may be inserted into the holes. When the sliding engagement between the cartridge holder 8 and the sliding surfaces 15 of the eject plate 12 is released, the loading plate 20 is moved along the guide shafts 41 in the direction of the arrow B by the biasing force of the second resilient members 27. At the same time, the cartridge holder 8 is moved along the guide grooves 11 in the direction C to the second position. Thereafter, the cartridge 1 is set on positioning posts (not shown in FIG. 1) provided on the cartridge loading device, thus completing the loading of the cartridge 1 and holding the disc 6 rotatably on the rotary drive member 7. Also, at this time, since the sub-eject lever 28 is resiliently engaged with the loading plate 20 by the first resilient members 37, the sub-eject lever 28 is also moved together with the loading plate 20 along the guide shafts 43 in the direction B. When the cartridge holder 8 is moved to the second position, an electric current is applied to the drive means 60, so that the first lock lever 38 is rotated, as shown in FIG. 3, in a direction indicated by arrow H by the attraction force of the drive means 60, thus engaging the lock pin 39 with the lock claw 25 of the loading plate 20. At this time, even if vibrations or any other external forces are generated, the loading plate 20 is locked to the base 40 by the first lock lever 38 so that the loading plate 20 per se is not moved in the direction A. Also, the cartridge holder 8 is prevented from moving in the direction D by the inclined surfaces 23b of the guide holes 23, and the cartridge holder 8 is never moved in the direction D so far as the lock of the loading plate 20 is released. Therefore, even if the vibrations or any other external forces would be generated, the cartridge 1 may not be moved. There is no fear that the disc 6 would be brought into contact with the inner walls of the cartridge resisting in damage of the disc 6. FIG. 2a shows this state of the loading plate 8 and the sub-eject plate 28. In this state, the push button 49 of the sub-eject plate 28 is disposed in front of the substrate 40 in order to facilitate a manual operation thereof.

Figure 2B:
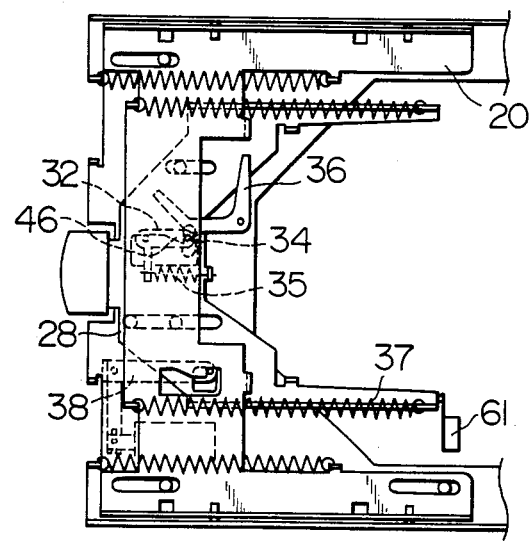
Figure 4:
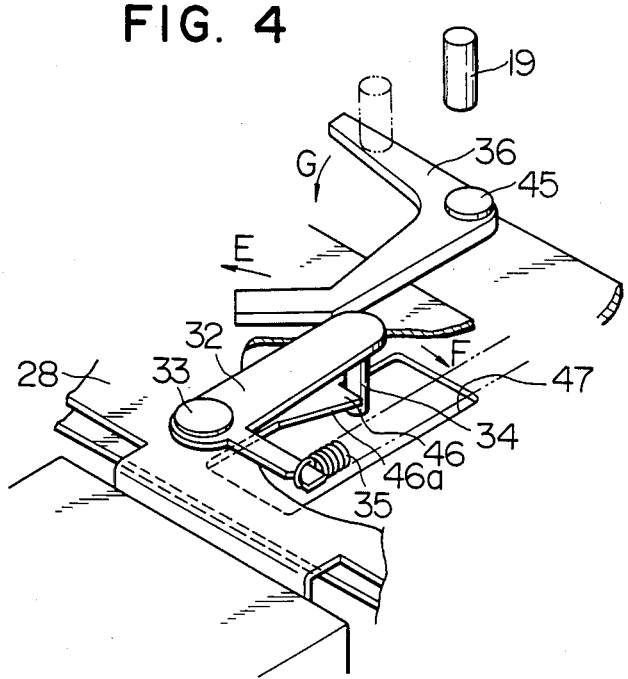
FIG. 4 is a perspective view showing the operated state of the second lock lever of the device shown in FIG. 1.
Figure 5:
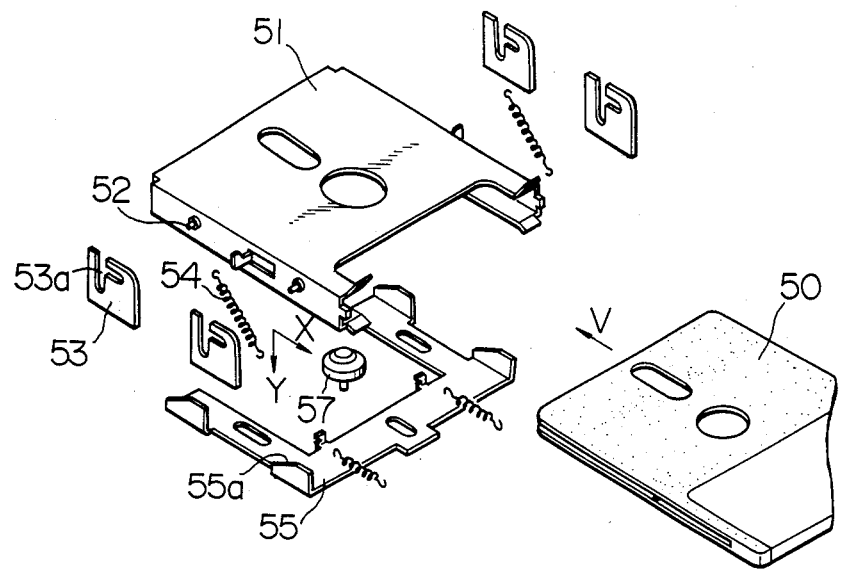
FIG. 5 is an exploded perspective view of a conventional cartridge loading device.
Figure 6A:
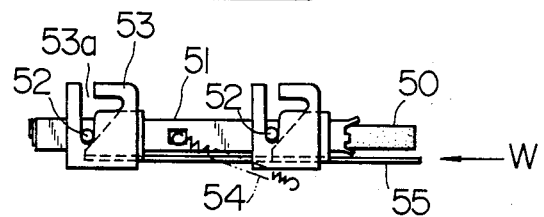
FIGS. 6a and 6b are side elevational views showing the loading operation of the device shown in FIG. 5.
Figure 6B:
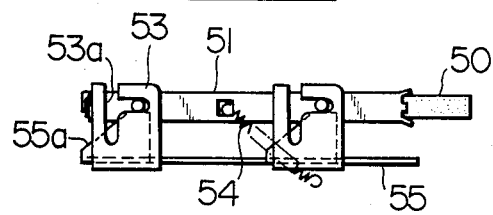

Upon unloading the cartridge 1, by pushing button 49 against the spring force of the first elastic members 37 in the direction indicated by arrow A as shown in FIG. 2a, the sub-eject plate 28 is moved along the guide shafts 43. When the sub-eject plate 28 is moved, the second lock lever 32 is rotated in the direction indicated by arrow F, since the lock pin 34 is slid on the inclined surface 46a of the lock claw 46 of the base 40. When the push button 49 is further depressed, the engagement of the lock pin 34 and the inclined surface 46a is released, so that the second lock lever 32 is rotated by the spring member 35 in the direction indicated by arrow E. As a result, the lock pin 34 is engaged with the lock claw 46 as shown in FIG. 4, thus interlocking the sub-eject plate 28 to the substrate 40. This condition is shown in FIG. 2b. As shown in FIG. 2b, since the loading plate 20 and the sub-eject plate 28 are locked to the substrate 40 by the first lock lever 38 and the second lock lever 32, respectively, the two components 20 and 28 are caused to approach each other by the spring force of first elastic members 37. The spring force of first elastic members 37 is larger than that of second elastic members 27. At the time when the push button 49 is pushed and the sub-eject plate 28 is locked by the second lock lever 32, a detecting means 61 such as a microswitch is operated to generate a stop signal to the rotary drive member 7, thus stopping the rotation of the rotary drive member 7. The detecting means 61 is actuated when the sub-eject lever 28 is moved in the direction A, and the sub-eject lever 28 is locked by the second lock lever 32. Since the electric supply to the drive means 60 is stopped at the time when the rotation of the rotary drive member 7 is completely stopped, the first lock lever 38 is rotated in a direction indicated by the arrow I by the spring force of the first elastic members 37, so that the engagement of the lock pin 39 and the lock claw 25 is released. (A contact surface 25a, of the lock claw 25, which is in contact with the lock pin 39 for restricting the movement, in the direction A, of the loading plate 20 is formed so as to be somewhat inclined forwardly in FIG. 3 so that, when the electric supply to the drive means 60 is stopped, the first lock lever 38 is rotated in the direction I by the spring force of the first resilient members 37, and the lock condition may readily be released.) Then, since the restriction of the movement in the direction A of the loading plate 20 is released, the loading plate 20 is moved by the spring force of the first resilient members 37 until the walls 24 are brought into contact with the projections 31 of the sub-eject plate 28. At this time, the inclined surfaces 23a of the guide holes 23 of the loading plate 20 are brought into contact with the pins 9 of the cartridge holder 8. The cartridge holder 8 is lifted in the direction D by the guide grooves 11 and is moved to the first position. Then, the engagement between the walls 16 of the eject plate 12 and the pins 9 is released, and the eject plate 12 is moved in the direction B by the spring force of the third resilient members 18 to thereby discharge the cartridge 1. At the same time, the pins 19 formed on the eject plate 12 cause the release lever 36 to rotate in the direction G as shown in FIG. 4. When the release lever 36 is rotated, the second lock lever 32 is rotated in the direction F, so that the engagement between the lock pin 34 and the lock claw 46 is released. Thus, the sub-eject plate 28 may be moved in the direction B. Thereafter, when the cartridge 1 is drawn away from the cartridge holder 8, the shutter 4 again closes the center hole 2 and the head insertion hole 3 as shown in FIG. 1, thereby preventing foreign matter from entering the cartridge 1 and attaching to the disc 6.

In the case of power failure or in the case where the power source is turned off, and if the cartridge is desired to be unloaded, the depression of the push button 49 will cause the loading plate 20 to move in association with the movement of the sub-eject plate 28, thus lifting the cartridge holder 8 to the first position to discharge the cartridge 1.

As has been described above, the device according to the present invention is so constructed that the disc may be automatically set in the device simply by inserting the cartridge into the cartridge holder, and after the completion of the loading, the loading plate for driving the cartridge is locked onto the base while the cartridge is prevented from lifting upwardly by the guide holes. Therefore, even if vibrations or any other external forces are generated, the rotating disc will not be brought into contact with the inner walls of the cartridge. Also, when the cartridge is unloaded, the loading plate for driving the cartridge holder is not directly pushed but the loading plate is locked on the base and the sub-eject plate elastically engaged with the loading plate by the resilient members is pushed. Then, the sub-eject plate is locked on the base, the lock of the loading plate is released after the stop of the rotation of the disc, the spring force of the elastic members causes the loading plate to move, and the cartridge holder is lifted upwardly. Therefore, the disc would not be damaged upon the unloading of the cartridge. Nor will the disc abrade the inner walls of the cartridge. Also, even if the sub-eject lever is pushed the cartridge unloading operation is not obstructed since the cartridge holder is not directly driven by the sub-eject plate. Additionally, if the cartridge is unloaded upon an electric power failure or when the power source is turned off, the cartridge may be unloaded simply by depressing the push button in a normal manner.

The device according to the present invention enjoys the following advantages.

Since the guide holes of the loading plate for the driving the cartridge holder are inclined and the pins of the cartridge holder are in sliding contact with the inclined surfaces, the cartridge is not abruptly lowered to be set in the device. Therefore, there is no generation of noises upon the setting of the cartridge or no damage of the cartridge. Also, since all the components of the sub-eject plate, loading plate and eject plate may be mounted in one direction, the ends of the guide holes of the loading plate and the guide grooves of the base, engaged with the pins of the cartridge holder are opened so that the cartridge holder may be mounted in the device simply by inserting the cartridge holder from above, it is possible to extremely simplify the assembling work.

Therefore, according to the present invention, there is provided a cartridge loading device which is capable of preventing the disc from being damaged during operation or loading of the cartridge, and of keeping the disc always in a good condition with an extremely simple structure.

According to the invention, the loading plate causes the cartridge holder, receiving the cartridge, to be reciprocatingly movable between a first position where the cartridge may be inserted or discharged and a second position where the disc received in the cartridge is rotated. The first lock lever for locking the loading plate to the second position restricts the movement of the loading plate toward the second position. Even if the vibrations or any other external forces are generated in the cartridge loading condition, the cartridge holder is held in a predetermined position and the disc is prevented from being contacted with the inner surface of the cartridge when the disc is rotated.

Also, when the cartridge is unloaded, the loading plate for moving the cartridge holder to the first position is not directly moved but the sub-eject plate contacting with the loading plate is pushed through elastic members, and the second lock lever locks the sub-eject plate. After the stop of rotation of the disc, the lock state of the first lock lever is released and the loading plate is moved from the second position to the first position by the elastic members, to thereby discharge the cartridge. Thus, during the rotation of the disc, there is no fear that the cartridge would be discharged and the disc would be damaged. It is therefore possible to always keep the disc in a good condition.

In the preferred embodiment of the invention, the guide holes 23 of the loading plate 20 are inclined but it is preferable that slant angles of the guide holes 23 be changed where the cartridge holder 8 is located at the first position and at the second position.

We claim:

1. A cartridge loading device comprising:
   a cartridge holder for receiving therein a cartridge, said cartridge holder having side walls with pins formed thereon;
   a base provided with guide grooves through which said pins formed on side walls of said cartridge holder are received, for guiding said cartridge holder;
   a loading plate supported movably on said base for causing said cartridge holder to reciprocatingly move along said guide grooves of said base between a first position where said cartridge is loaded/unloaded and a second position where a disc received in said cartridge is adapted to be drivingly rotated;
   an eject plate supported movably on said base, for unloading said cartridge recieved in said cartridge holder, for holding said cartridge holder at said first position and for allowing, when said cartridge is loaded, said cartridge holder to move to said second position;
   a sub-eject plate supported movably on said base which is adapted to come into contact with said loading plate;
   at least one first resilient member connected at one end to said loading plate and at the other end to said sub-eject plate for resiliently engaging said loading plate and said sub-eject plate with each other;

at least one second resilient member for biasing said loading plate in one direction;

at least one third resilient member for biasing said eject plate in a direction for discharging said cartridge;

a first lock lever engaging with a lock claw formed in said loading plate to thereby lock said loading plate and restrict a movement of said loading plate;

a second lock lever for locking said sub-eject lever and restricting a movement of said sub-eject lever; and a drive means for driving said first lock lever.

2. The cartridge loading device according to claim 1, wherein a release lever is rotatably supported to said substrate, and a pin for rotating said release lever is formed on said eject plate.

3. The cartridge loading device according to claim 1, wherein said second lock lever is rotatably mounted on said sub-eject plate, and a lock claw engaging with a lock pin provided on said second lock lever is formed on said base.

4. The cartridge loading device according to claim 1, or 3, further comprising an elastic member connected at one end to said sub-eject plate and at the other end to said second lock lever for biasing said second lock lever to a lock claw of said base.

5. The cartridge loading device according to claim 1, wherein when said cartridge holder is moved to said second position, said drive means is actuated to thereby lock said loading plate; when said sub-eject plate is pushed against a spring force of said first elastic member, said sub-eject plate is locked to be prevented from being returned; the actuation of said drive means is stopped to release the lock of said loading plate; and said loading plate is moved by the resilient force of said first resilient member so that said cartridge holder is moved from said second position to said first position.

6. The cartridge loading device according to claim 1 or 5, wherein said loading plate has walls and said sub-eject plate has projections which contacts with said walls of said loading plate.

7. The cartridge loading device according to claim 1 or 5, wherein said drive means comprises a solenoid.

8. The cartridge loading device according to claim 1, wherein said loading plate has guide holes through which said pins of said cartridge holder are movably inserted, and said eject plate has walls for contacting with said cartridge and sliding surfaces for slidingly contacting with said pins of said cartridge holder, and wherein said eject plate is moved by said cartridge inserted into said cartridge holder, thereby disengaging said pins of said cartridge holder from said sliding surfaces of said eject plate, and said loading plate is moved by a resilient force of said second resilient member so that said cartridge holder is moved from said first position to said second position.

9. The cartridge loading device according to claim 1 or 8, wherein a biasing direction of said second resilient member is the cartridge discharging direction.

10. The cartridge loading device according to claim 8, wherein said guide holes of said loading plate are inclined, and slant angles of said guide holes are changed where the cartridge holder is located at said first position and at said second position.

11. The cartridge loading device according to claims 1, 8 or 10, wherein first ends of said guide grooves of said base and first ends of guide holes of said loading plate are opened so that said pins of said cartridge holder may be inserted through the first ends of said guide grooves of said substrate and said guide holes of said loading plate.

* * * * *

UNITED STATES PATENT AND TRADEMARK OFFICE
CERTIFICATE OF CORRECTION

PATENT NO. : 4,727,444

DATED : February 23, 1988

INVENTOR(S) : FUKUSHIMA et al

It is certified that error appears in the above-identified patent and that said Letters Patent is hereby corrected as shown below:

Claim 1, column 9, line 9, change "lever" (second occurrence) to --plate--;

line 10, change "lever" to --plate--.

Signed and Sealed this

Thirteenth Day of September, 1988

Attest:

DONALD J. QUIGG

Attesting Officer

Commissioner of Patents and Trademarks